April 25, 1967 R. P. HAWKINSON 3,315,319
TIRE RETREADING MOLD
Filed May 7, 1965 2 Sheets-Sheet 1
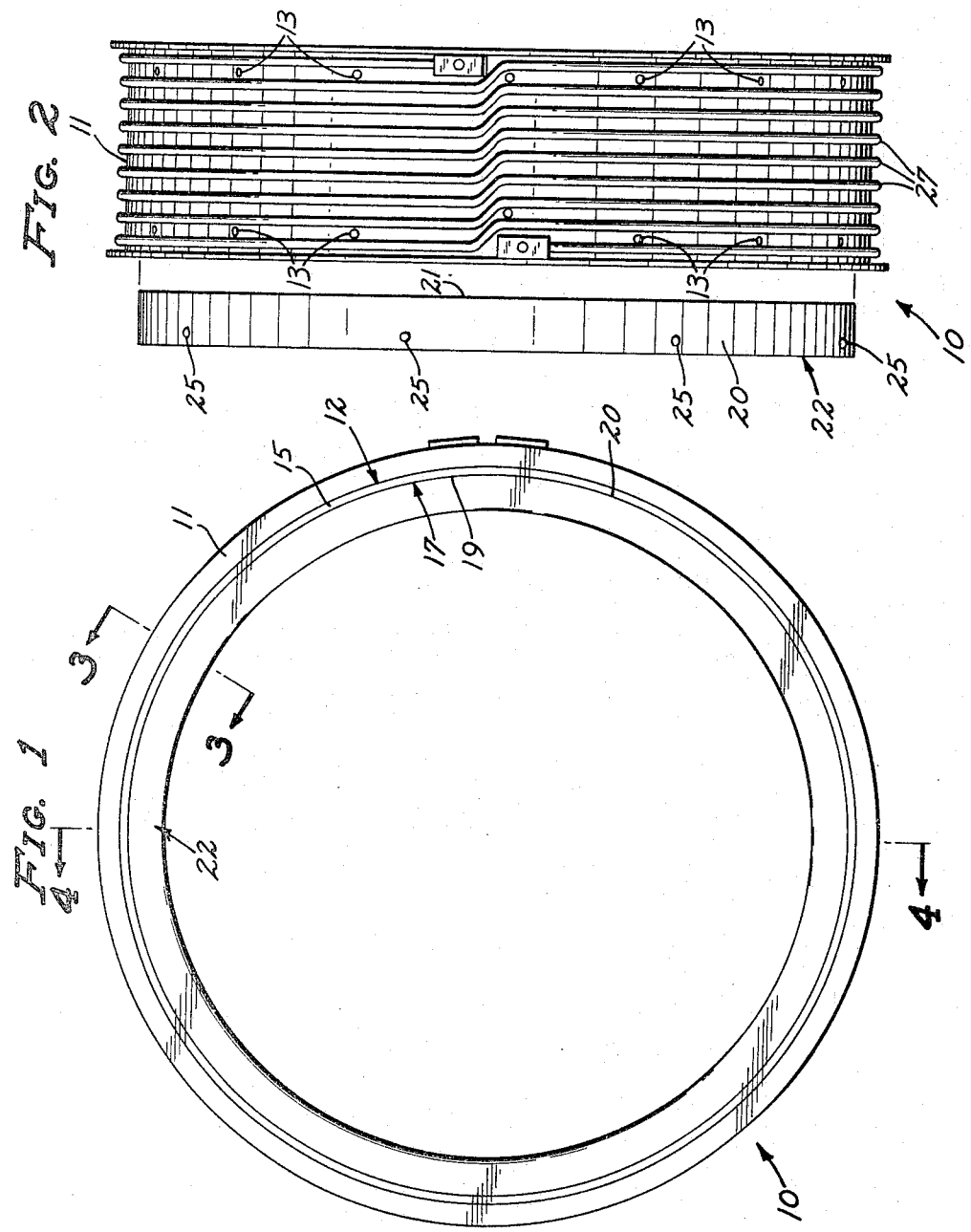
INVENTOR.
*Raymond P. Hawkinson*
BY
*Merchant, Merchant & Gould*
ATTORNEYS

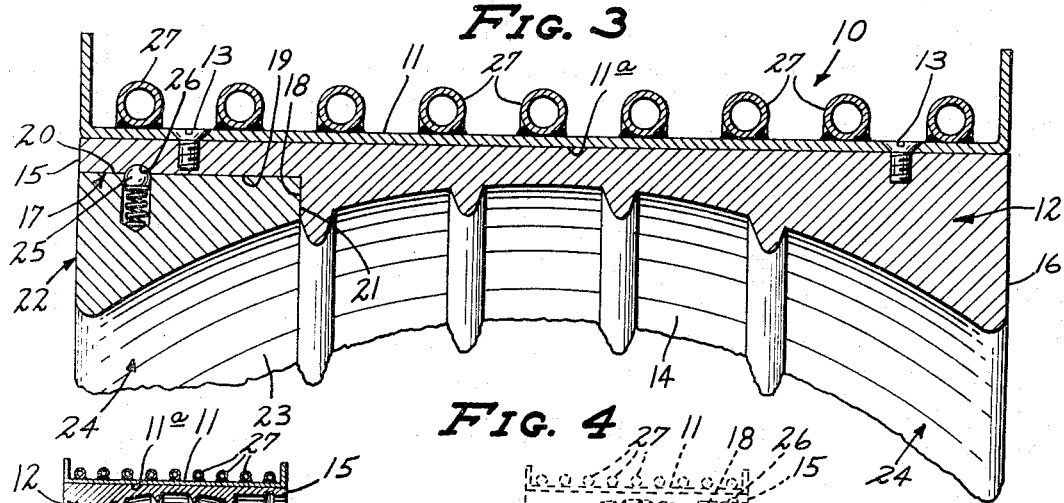
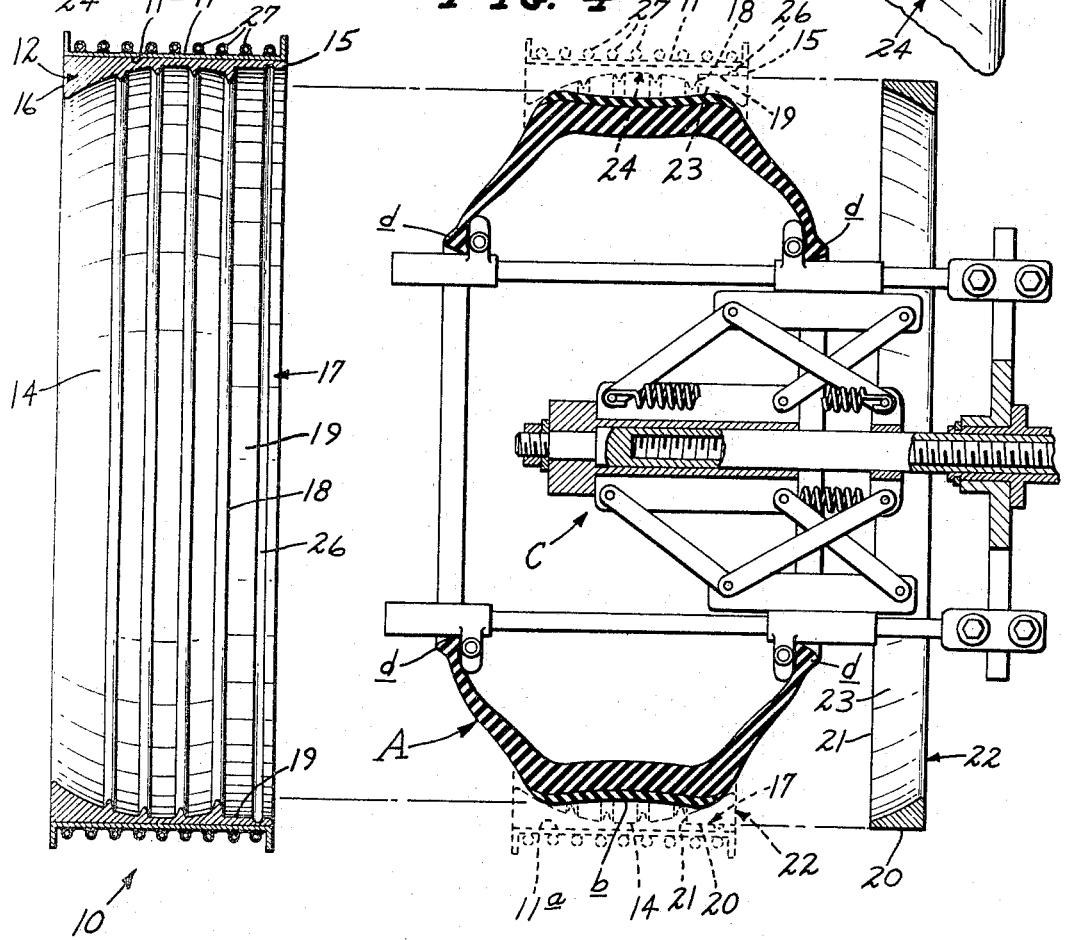

3,315,319
TIRE RETREADING MOLD

Raymond P. Hawkinson, Minneapolis, Minn., assignor to Paul E. Hawkinson Company, Hennepin, Minn., a corporation of Minnesota
Filed May 7, 1965, Ser. No. 454,103
2 Claims. (Cl. 18—44)

My invention relates generally to tire repair equipment, and more specifically to a repair mold for aircraft tires or the like.

In the repair or recapping of such tires, it is necessary to spread the bead portions thereof a considerable amount for the purpose of reducing the outside diameter of the crown portion prior to insertion of the tire casing into a repair mold. Due to the much heavier construction of this type of tire and often the great size thereof, special heavy duty machines must be used to accomplish this end. Further, such spreading of the beads often results in damage, such as kinking or bending of the reinforcing wires which run therethrough.

Therefore, it is a primary object of my invention to provide a repair mold which requires but a minimum amount of bead spreading prior to insertion of a tire casing thereinto.

It is a further object to provide a tire repair mold which does not require special heavy duty equipment to insert a tire casing thereinto.

It is a still further object to provide a tire repair mold that is rugged and durable in construction, requires but a minimum of time and effort to mount on a tire casing, and is simple and inexpensive to produce.

These and other objects will become apparent from that which follows in the accompanying drawings, specification and appended claims.

Referring to the drawings wherein like characters are indicated by like numerals:

FIG. 1 is a view in elevation of my novel tire repair mold;

FIG. 2 is a view in exploded elevation as seen from right to left of FIG. 1;

FIG. 3 is an enlarged sectional view as seen from the line 3—3 of FIG. 1; and

FIG. 4 is an exploded view in section as viewed from the line 4—4 of FIG. 1 and showing same being mounted on a tire casing.

Referring with greater particularity to the several views shown in the accompanying drawings, there is shown a tire repair mold 10 such as is used in the recapping of aircraft tires or the like. Mold 10 is shown as including a cylindrical sheet metal mold portion 11 which has received therein the annular primary matrix section 12 formed from a cast metal such as aluminum alloy. Primary matrix 12 is made fast to the inner surface 11a of mold portion 11 by means of the circumferentially spaced screw elements 13. The radially inner surface of primary matrix section 12 is formed to define a generally cross-sectionally arcuate tread-design-forming cavity 14. One side edge portion 15 of primary matrix section 12 is shown as being diametrically enlarged to permit entrance of the crown portion *b* of a tire casing A thereinto, while the other side portion 16 thereof is of a diametric dimension to bar exit of the crown portion *b* axially therefrom, the reason of which will become apparent in the following description of operation. Formed in the side 15 is an axially outwardly and radially inwardly opening recess 17 which defines an annular shoulder 18 and a cylindrical wall surface 19.

Removably, snugly receivable in the recess 17 with the outer surface 20 engageable with cylindrical surface 19 and the inner edge 21 in engagement with the annular shoulder 18 is a complementary matrix section 22. The radially inner surface 23 of matrix section 22 is of a contour so as to form a continuation of cavity 14 of matrix 12 when same is received within the recess 17 and cooperates to form a symmetrical molding surface 24, as seen particularly in FIG. 3.

For the purpose of removably retaining the complementary matrix section 22 within the recess 17 and in engagement with shoulder 18, there is provided a plurality of circumferentially spaced ball detents 25, all of which are receivable in cooperating seat means such as the annular groove 26, formed in the surface 19 of recess 17, when edge 21 of matrix 22 is in engagement with shoulder 18.

When it is desired to mount a tire casing A within the cavity 14 of mold 10 matrix section 22 is removed from recess 17 and placed on the bead spreading device C, as shown particularly in FIG. 4. Thereafter, tire A is mounted on the device C and beads *d* are spread a sufficient distance axially to reduce the outside diameter of tire A so as to permit reception thereof through the diametrically enlarged side 15 as shown by dotted lines of FIG. 4. Complementary matrix 22 is then inserted into recess 17 to a point where edge 21 is in engagement with shoulder 18 and detents 25 are received in the groove 26, thus providing the symmetrical molding surface 24. In this position matrix section 22 is held in place during subsequent release of beads *d* and expansion of crown *b* of tire casing A. It will be noted that tire A is correctly positioned or centered with respect to mold 10 before the beads *d* are released. After the above steps have been accomplished, the mold 10 and tire casing A are ready to be placed in mold supporting mechanism, not shown, and vulcanizing heat from a source, also not shown, is applied to the crown *b* of tire casing A through the medium of the tubular conduit element 27. After the recapping process is completed, mold 10 is removed from the supporting mechanism, replaced on the bead spreading device C, and after a minimum amount of spreading, matrix sections 12, 22 are removed. Thus, for reasons above outlined, during both insertion and removal of tire casing A, a minimum amount of bead spreading is required to remove tire casing A from matrix section 12 when the matrix section 22 is removed from the recess 17.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:
1. In a mold for aircraft tires and the like,
 (a) a cylindrical sheet metal mold,
 (b) an annular cast metal primary matrix section snugly received within said mold and made fast thereto,
 (c) said primary matrix section defining a generally cross-sectionally arcuate tread-design-forming cavity for the crown of the tire and in which the width of the tread-forming cavity for the crown has a substantially wide and deep surface, and the arc of curvature of the tread forming surface is generally continuous and of a high degree of curvature,

(d) one side portion of said matrix having an axially outwardly and radially inwardly opening annular recess in the tread-forming surface defined by an annular shoulder and a generally cylindrical wall surface,
(e) a complementary annular matrix section removably snugly receivable in said recess and being supplemental to and having a tread-forming surface which is continuous with said highly curved tread-forming surface of said primary matrix section, and
(f) means for removably retaining said complementary matrix section in said recess and in engagement with said shoulder.

2. The structure defined in claim 1 in which said means comprises ball detent means in one of said matrix sections and cooperating seat means in the other of said matrix sections.

References Cited by the Examiner

UNITED STATES PATENTS

| | | | |
|---|---|---|---|
| 2,659,104 | 11/1953 | Glynn | 18—18 |
| 2,712,156 | 7/1955 | Potter et al. | 18—18 |
| 2,822,576 | 2/1958 | Rowe | 18—18 |
| 3,200,443 | 8/1965 | Maddox et al. | 18—18 |
| 3,240,653 | 3/1966 | Mattox et al. | 18—18 |

WILLIAM J. STEPHENSON, *Primary Examiner.*

J. HOWARD FLINT, JR., *Examiner.*